United States Patent [19]

Iguchi

[11] Patent Number: 5,704,114
[45] Date of Patent: Jan. 6, 1998

[54] ARMATURE COIL CONDUCTOR ARRAYING APPARATUS

[75] Inventor: Mikio Iguchi, Himeji, Japan

[73] Assignee: Mitsubishi Denki Kabushiki Kaisha, Tokyo, Japan

[21] Appl. No.: 496,286

[22] Filed: Jun. 29, 1995

[51] Int. Cl.$^6$ .................................................. B23P 19/00
[52] U.S. Cl. .......................... 29/735; 29/564.5; 310/195
[58] Field of Search .............................. 29/564.5, 598, 29/732, 735, 736; 310/195, 208; 140/93 R

[56] References Cited

U.S. PATENT DOCUMENTS

| 1,661,344 | 3/1928 | Poole | 29/735 X |
| 2,476,745 | 7/1949 | Leece | 29/732 X |
| 5,211,670 | 5/1993 | Ohmi et al. | 29/598 |

FOREIGN PATENT DOCUMENTS

| 406273 | 7/1974 | U.S.S.R. | 29/735 |

Primary Examiner—Larry I. Schwartz
Assistant Examiner—Khan Nguyen
Attorney, Agent, or Firm—Sughrue, Mion, Zinn, Macpeak & Seas, PLLC

[57] ABSTRACT

In an armature coil conductor arraying apparatus, a cylindrical coil guide tool 25 has a plurality of inner insertion holes or grooves 23a into which inner legs of coil conductors 2 are inserted and a plurality of outer grooves 24a provided radially outwardly of the inner insertion holes in respective outer peripheries of cylindrical inner coil holder 23 and cylindrical outer coil holder 24. A cylindrical holder 26 rotatable about an axis of the coil guide tool is disposed radially outwardly of the coil guide tool, and mounts a plurality of inclined settling plates or guides 29 for guiding outer legs of the coil conductors into the outer grooves when the holder is rotated.

6 Claims, 5 Drawing Sheets

FIG. I

ARMATURE COIL CONDUCTOR ARRAYING APPARATUS

BACKGROUND OF THE INVENTION 1. Field of the Invention

The present invention relates to an armature coil conductor arraying apparatus and method which is used, e.g., when assembling an armature of an engine starter, to align and array a plurality of armature coil conductors into such a condition as enabling the conductors to be inserted to slots of an armature core. 2. Description of the Related Art FIG. 5 is a schematic view showing a prior art cutting apparatus for a coil conductor. Referring to FIG. 5, an armature coil conductor, i.e., a coil conductor 2, housed in a bobbin 1 is drawn out of the bobbin 1 by feed rollers 3 through a predetermined distance and is stopped there. An insulating coating on an outer periphery of the coil conductor 2 is then stripped off by a helical reamer 4 over a length of 2L. After that, the coil conductor 2 is cut by a cutter 5 at the center of the stripped length of 2L. As shown in FIG. 6, therefore, the coil conductor 2 after being cut has opposite end portions in each of which the insulating coating is stripped off over a length of L.

The cut coil conductors 2 are each bent into a U-form (hairpin form), as shown in FIG. 7. The bent coil conductors 2 are set in a coil twist tool 6 in a radial pattern, shown in FIG. 8, along an entire circumference. At this time, one linear portion of each coil conductor 2 is inserted to a groove in an inner twist tool 7 and the other linear portion is inserted to a groove in an outer twist tool 8. After that, an air cylinder 9 is operated to move a rack 10 for rotating a gear 11 held in mesh with the rack 10. With rotation of the gear 11, the inner twist tool 7 is rotated relative to the outer twist tool 8 and all the coil conductors 2 are shaped at a time. Then, by operating the air cylinder 12 so as to push back the rack 10 a little, unsteady motion between the inner and outer twist tools 7, 8 and the coil conductors 2 is eliminated, and changes in shape of the coil conductors 2 due to springback are corrected.

Next, as shown in FIG. 9, the coil conductors 2 are inserted to slots (not shown) of an armature core 13. Then, projected portions of the coil conductors 2 extending through the armature core 13 are shaped, and the end portions of the coil conductors 2 where the insulating coatings have been stripped off are connected to a commutator 14. The slots of the armature core 13 are provided with equal intervals therebetween in the circumferential direction, and are each divided into an inner peripheral part and an outer peripheral part by an insulating material (not shown). The coil conductors 2 are each arranged such that one linear portion, i.e., an inner leg, is inserted to the inner peripheral part of one slot and the other linear portion, i.e., an outer leg, is inserted to the outer peripheral part of another slot in a position circumferentially shifted by a predetermined number of slots from the slot to which the inner leg is inserted.

However, the above-mentioned prior art method for shaping and aligning the coil conductors 2 by the coil twist tool 6 has had a difficulty in shaping all the coil conductors 2 into a predetermined form because a plurality of hairpin-like coil conductors 2 are twisted at a time. Also, a recess (not shown) is often formed in, e.g., an outer periphery of a coil end 2a to receive a ring (not shown) which serves to prevent the coil end 2a from expanding by centrifugal force. But such a recess is hard to form by twisting and requires a separate step for its formation, which means the need of much time and labor. Further, an apparatus and a method for combining and arraying the coil conductors 2 completely shaped into a condition as enabling the coil conductors to be inserted to the slots of the armature core 13 have not yet been proposed.

SUMMARY OF THE INVENTION

In view of solving the problems as set forth above, an object of the present invention is to provide an armature coil conductor arraying apparatus and method which can use coil conductors of a desired shape and which can surely and smoothly settle and array the coil conductors.

An armature coil conductor arraying apparatus of the present invention comprises a cylindrical coil guide tool having a plurality of inner insertion holes which are provided with equal intervals therebetween in the circumferential direction and to which inner legs as one linear portions of substantially U-shaped coil conductors shaped into a predetermined form are inserted, and a plurality of outer grooves provided radially outwardly of the inner insertion holes in respective outer peripheries thereof; a cylindrical holder provided radially outwardly of the coil guide tool and being rotatable about an axis of the coil guide tool; and a plurality of guide members mounted to an inner peripheral surface of the holder with equal intervals therebetween in the circumferential direction for pressing and guiding outer legs as the other linear portions of the coil conductors and rotating the coil conductors about the inner legs so that the outer legs are inserted to the outer grooves, when the holder is rotated.

An armature coil conductor arraying method of the present invention comprises the steps of holding inner legs as one linear portions of a plurality of substantially U-shaped coil conductors shaped into a predetermined form on the same circumference with intervals therebetween, and pressing outer legs as the other linear portions of the coil conductors in the same circumferential direction at a time, for thereby rotating the coil conductors about the inner legs.

DETAILED DESCRIPTION OF PREFERRED EMBODIMENT

Figure 1:
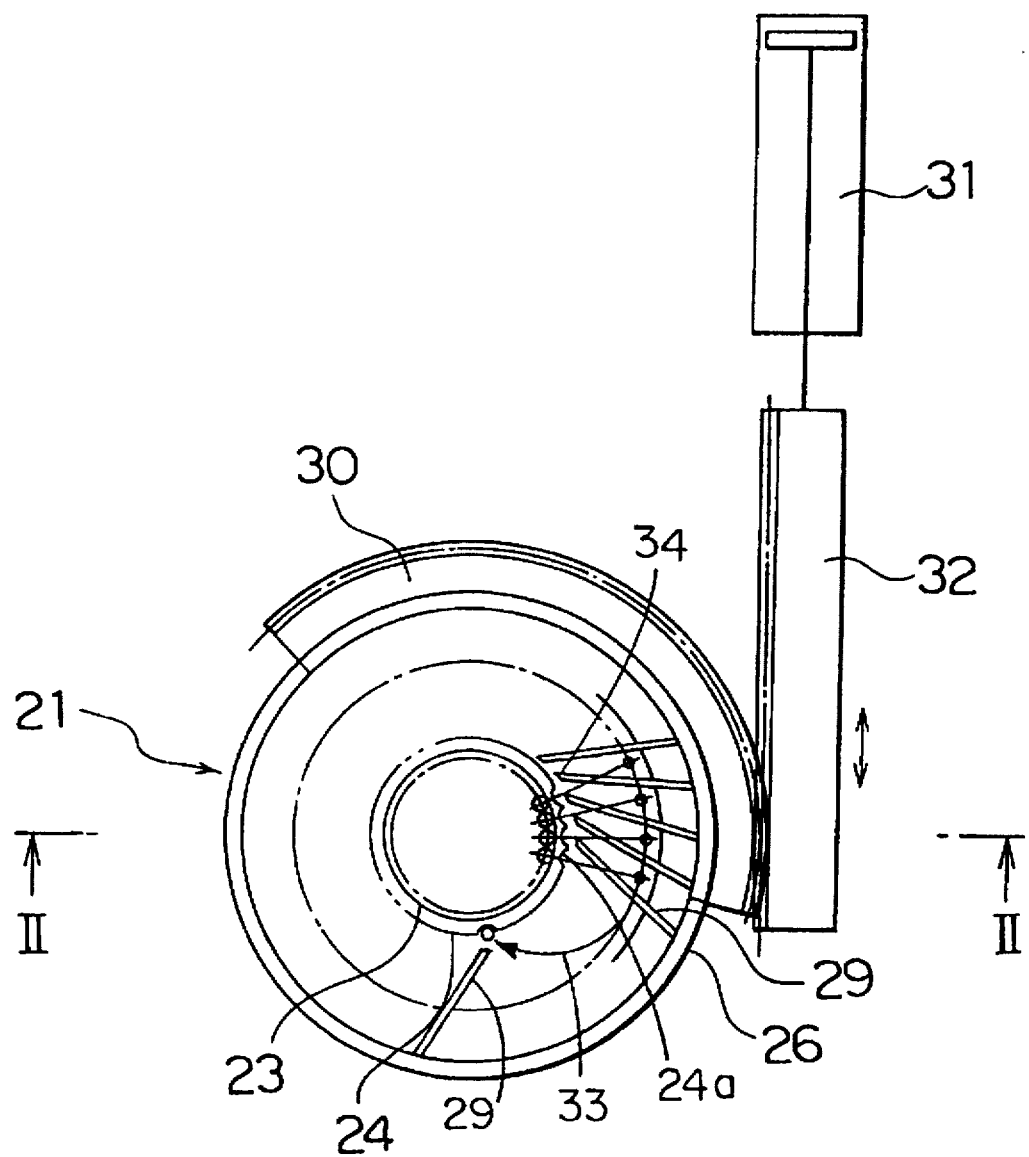
FIG. 1 is a schematic view showing an armature coil conductor arraying apparatus according to one embodiment of the present invention.
Figure 2:
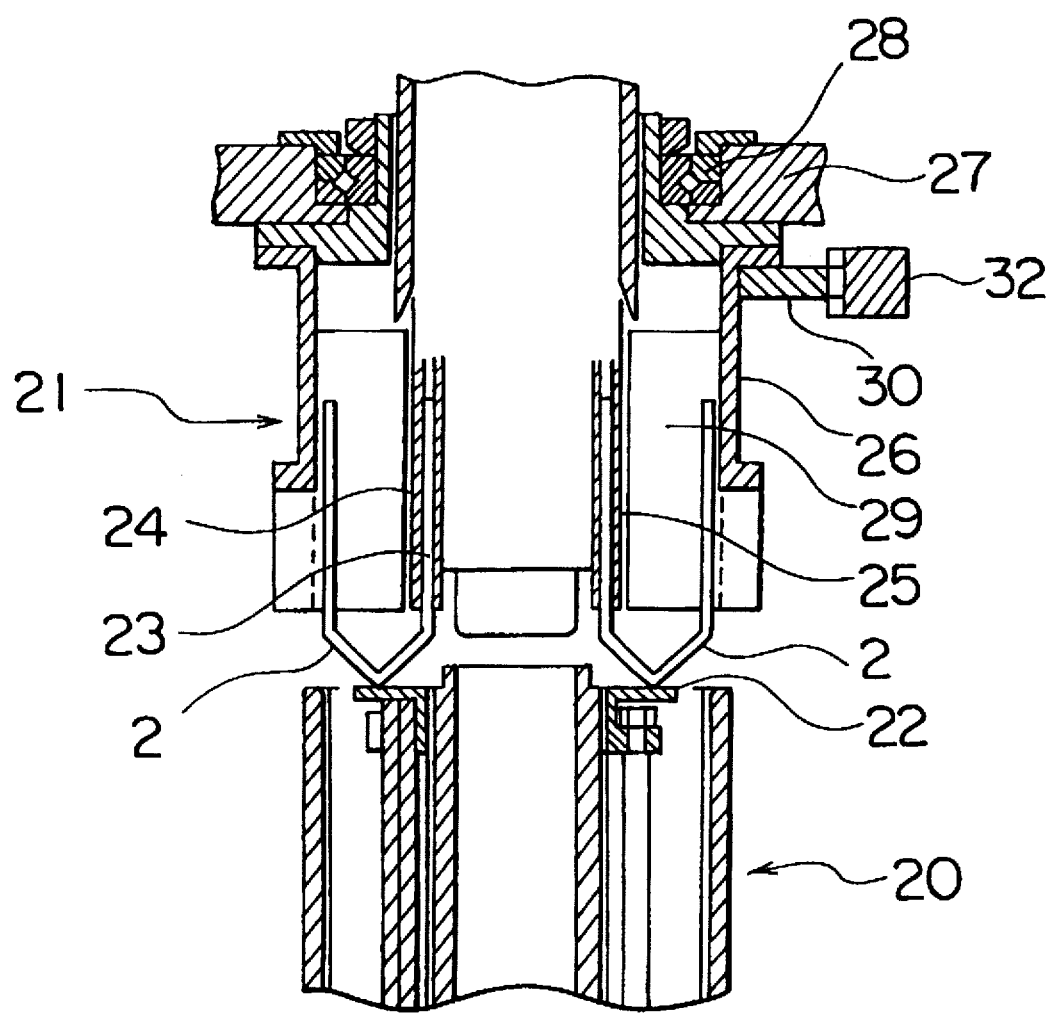
FIG. 2 is a sectional view taken along line II—II in FIG. 1.

An embodiment of the present invention will hereinafter be described with reference to the drawings. FIG. 1 is a schematic view showing an armature coil conductor arraying apparatus according to one embodiment of the present invention, and FIG. 2 is a sectional view of FIG. 1.

Figure 9:
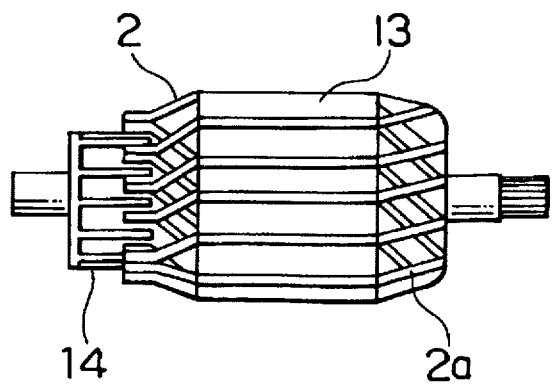
FIG. 9 is a side view showing one example of an armature.

An arraying apparatus 21 of the present invention is disposed above a magazine (arraying tool) 20 for housing coil conductors 2 in a radial pattern, which have been shaped into a predetermined form enabling the coil conductors 2 to be directly inserted to slots of the armature core 13 (FIG. 9). The coil conductors 2 are supported by a coil pusher 22 of the magazine 20. The coil pusher 22 is vertically movable by an air cylinder (not shown). The magazine 20 has an annular space defined between two concentric cylinders for housing the shaped coil conductors 2 which are held therein such that their legs are inserted to axial grooves defined in inner and outer cylindrical walls.

Figure 3:
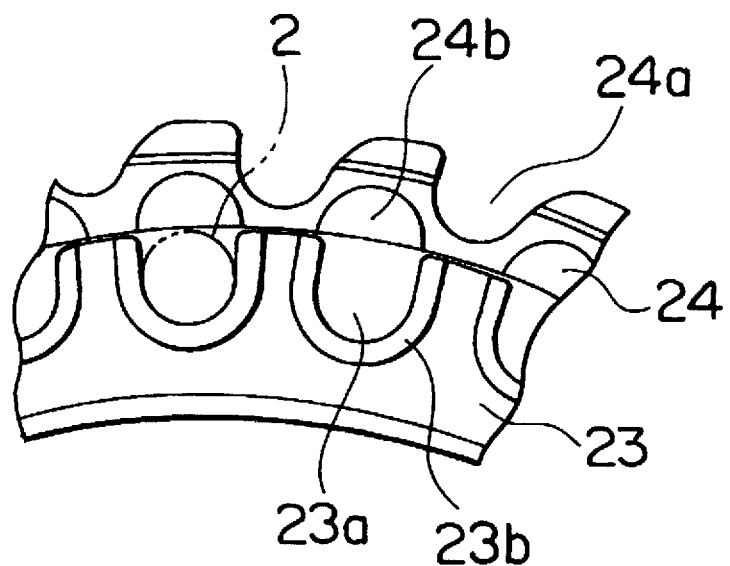
FIG. 3 is an enlarged view of part of an end face of a coil guide tool shown in FIG. 1.
Figure 4:
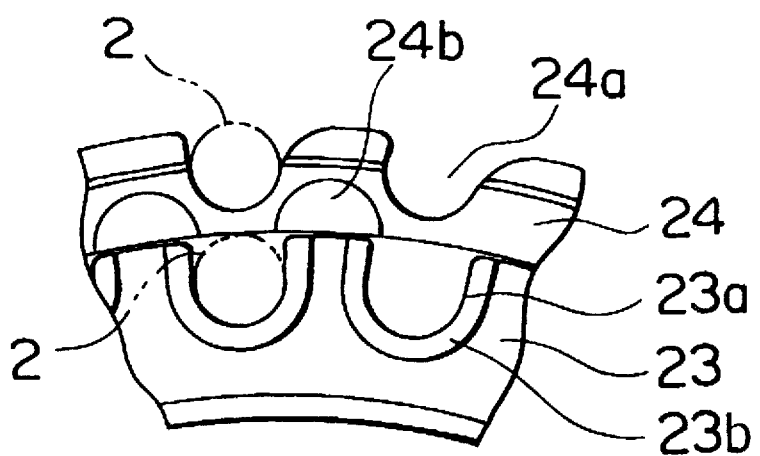
FIG. 4 is an enlarged view similar to FIG. 3, the view showing a state where an outer coil holder is rotated a half pitch with respect to an inner coil holder.
Figure 5:
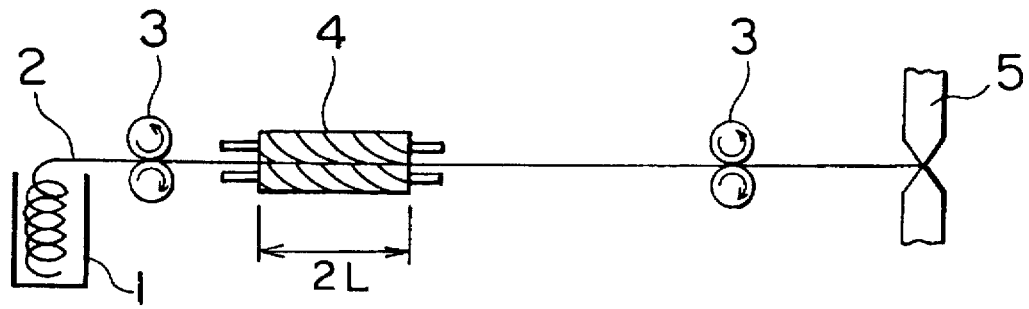
FIG. 5 is a schematic view showing a prior art cutting apparatus for a coil conductor.
Figure 6:
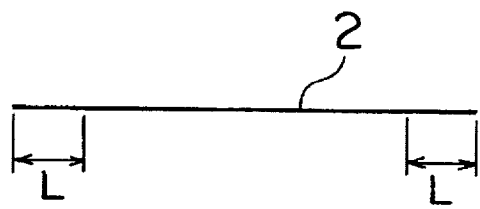
FIG. 6 is a view showing a coil conductor cut by the cutting apparatus of FIG. 5.
Figure 7:
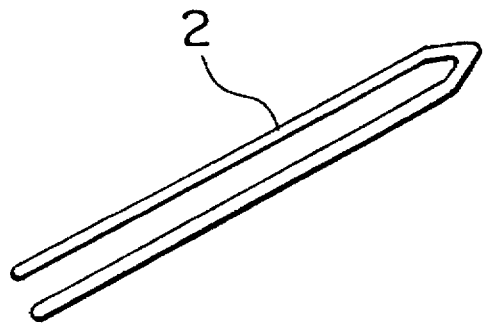
FIG. 7 is a perspective view showing a state where the coil conductor of FIG. 6 is bent.
Figure 8:
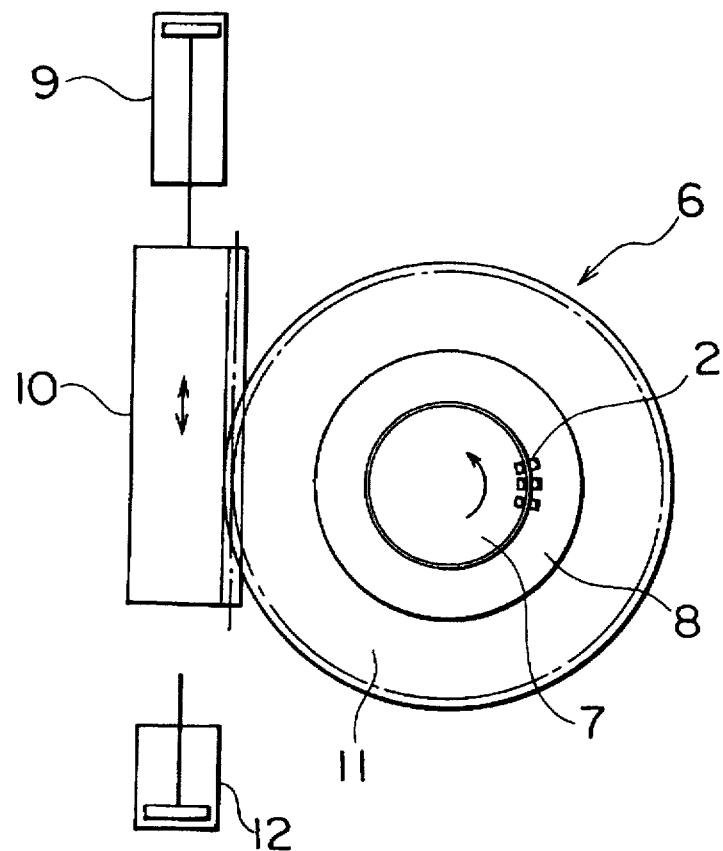
FIG. 8 is a schematic view showing a prior art coil twist tool.

A cylindrical inner coil holder 23 is provided at the center of the arraying apparatus 21. Along an outer periphery of the inner coil holder 23, as shown in FIGS. 3 and 4, there are provided inner insertion holes, i.e., inner grooves 23a each having a U-shaped cross-section, to which the inner legs (one linear portions) of the coil conductors 2 are inserted, with equal intervals therebetween in the circumferential direction. First chamfers 23b for smoothly guiding distal end portions of the inner legs of the coil conductors 2 into the inner grooves 23a are defined at edge portions of the inner grooves 23a.

The inner coil holder 23 is surrounded by a cylindrical outer coil holder 24. The outer coil holder 24 is rotatable with respect to the inner coil holder 23 so as to assume respective states shown in FIGS. 3 and 4. Along an outer periphery of the outer coil holder 24, outer grooves 24a to which the outer legs (the other linear portions) of the coil conductors 2 are inserted are provided with equal intervals therebetween in the circumferential direction. Further, second chamfers 24b are defined in an end face of the outer coil holder 24 for smoothly guiding the distal end portions of the inner legs of the coil conductors 2 into the inner grooves 23a in the state where the second chamfers are combined with the inner grooves 23a as shown in FIG. 3.

A coil guide tool 25 is made up by the inner and outer coil holders 23, 24. A cylindrical holder 26 is provided radially outwardly of the coil guide tool 25. The holder 26 is attached to a stationary member 27 through a bearing 28 to be rotatable about an axis of the coil guide tool 25. A plurality of guide members, i.e., settling plates 29, are mounted to an inner peripheral surface of the holder 26 with equal intervals therebetween in the circumferential direction. The settling plates 29 are inclined with respect to the radial direction so that, when the holder 26 is rotated clockwise in FIG. 1, the outer legs of the coil conductors 2 are guided by the settling plates 29 while sliding radially inwardly therealong in a spiralling path, as shown by arrow 33 in FIG. 1.

An arc-shaped gear 30 having teeth formed along its outer periphery is fixed to an outer periphery of the holder 26. Held in mesh with the gear 30 is a rack 32 reciprocatingly movable by an air cylinder 31 as rack driving means.

Operation of the illustrated embodiment will be described below. The coil conductors 2 cut into a predetermined size are each previously pressed into a predetermined shape suitable for insertion to the armature core 13. Also, the coil conductors 2 each have a recess formed in its coil end for fitting of the above-mentioned ring. The thus-shaped coil conductors 2 are set in the magazine 20 one by one in a radial pattern. At this time, the inner legs of the coil conductors 2 are arranged in the magazine 20 while being positioned in place.

When a required number of coil conductors 2 are set in the magazine 20, the magazine 20 is moved to a position below the arraying apparatus 21. Then, the coil conductors 2 are raised by the coil pusher 22 and, simultaneously, the arraying apparatus 21 is lowered, causing the inner legs of the coil conductors 2 to be inserted to the inner grooves 23a. On this occasion, the outer coil holder 24 is in a position shown in FIG. 3 where the second chamfers 24b face the inner grooves 23a, for smooth insertion of the inner legs. Further, upon the insertion of the inner legs to the inner grooves 23a, the outer legs of the coil conductors 2 are each arranged between the settling plates 29 adjacent to each other.

After that, the outer coil holder 24 is rotated a half pitch with respect to the inner coil holder 23 by an appropriate driving mechanism (not shown) such as a gear mechanism or a link mechanism, bringing the inner grooves 23a and the outer grooves 24a into an opposed state as shown in FIG. 4. The rack 32 is then moved by driving the air cylinder 31. The gear 30, the holder 26 and the settling plates 29 are thereby rotated together as one piece.

With the rotation, the outer legs of the coil conductors 2 are pressed by respective inclined side surfaces of the settling plates 29, rotated about the corresponding inner legs, and then settled into the outer grooves 24a of the outer coil holder 24. Finally, each of the outer legs comes into the outer groove 24a shifted from an position of the inner leg of the same coil conductor 2 by a predetermined number of grooves in the circumferential direction, and is prevented from slipping out of its outer groove 24a by being pressed by a distal end portion 34 of a corresponding settling plate 29, as illustrated in FIG. 1. It is desired that the settling plate 29 be formed of an elastic member such as a leaf spring for less strict demand for dimensional errors.

The coil conductors 2 settled and arrayed by the arraying apparatus 21 are inserted to the slots of the armature core 13, followed by carrying to the next step.

According to the arraying apparatus 21 described above, the coil conductors 2 previously shaped into a predetermined form can surely and smoothly be settled in place. In other words, the coil conductors 2 can be shaped into a desired shape and held in the same shape.

What is claimed is:

1. An armature coil conductor arraying apparatus, comprising:
   a) a cylindrical coil guide tool (25) defining a plurality of inner insertion holes (23a) provided with equal intervals therebetween in a circumferential direction and into which linear inner legs of substantially U-shaped coil conductors shaped into a predetermined form are inserted, and a plurality of outer grooves (24a) provided radially outwardly of said inner insertion holes in an outer periphery of the guide tool,
   b) a cylindrical holder (26) disposed radially outwardly of said coil guide tool, and rotatable about an axis of said coil guide tool, and
   c) a plurality of inclined guide members (29) mounted to an inner peripheral surface of said holder with equal intervals therebetween in the circumferential direction for pressing and guiding linear outer legs of said coil conductors in an inwardly spiralling direction so that said outer legs are led into said outer grooves, when said holder is rotated.

2. An armature coil conductor arraying apparatus according to claim 1, wherein said coil guide tool comprises a cylindrical inner coil holder having inner grooves, constituting said inner insertion holes, provided in an outer periphery thereof, and a cylindrical outer coil holder surrounding said inner coil holder, said cylindrical outer coil holder constituting said outer grooves and said outer periphery of said guide tool and rotatable with respect to said inner coil holder, first chamfers are defined at edge portions of said inner grooves, and second chamfers are defined in an end face of said outer coil holder and positioned to oppose said inner grooves when said outer coil holder is relatively rotated a half pitch of said outer grooves.

3. An armature coil conductor arraying apparatus according to claim 1, wherein said guide members are each a plate member.

4. An armature coil conductor arraying apparatus according to claim 3, wherein said guide members are each a settling plate which has a distal end portion for pressing said outer leg into said outer groove to prevent said outer leg from slipping out of said outer groove.

5. An armature coil conductor arraying apparatus according to claim 1, wherein said guide members are each an elastic member.

6. An armature coil conductor arraying apparatus according to claim 1, further comprising a gear provided at an outer periphery of said holder, a rack held in mesh with said gear, and rack driving means for reciprocatingly moving said rack to rotate said holder.

* * * * *